United States Patent
Kawajiri

(10) Patent No.: US 6,530,407 B1
(45) Date of Patent: Mar. 11, 2003

(54) METHOD OF FITTING TIRE FOR OFF ROAD MOTORCYCLE, AND TIRE FOR OFF ROAD MOTORCYCLE

(75) Inventor: Junichi Kawajiri, Saitama-ken (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/341,526

(22) PCT Filed: Sep. 24, 1997

(86) PCT No.: PCT/JP97/03394

§ 371 (c)(1),
(2), (4) Date: Jul. 13, 1999

(87) PCT Pub. No.: WO99/15347

PCT Pub. Date: Apr. 1, 1999

(51) Int. Cl.⁷ .............................. B60C 3/04; B60C 9/18
(52) U.S. Cl. .................. 152/454; 152/526; 152/531; 152/533
(58) Field of Search ................ 152/454, 526, 152/531, 533

(56) References Cited

U.S. PATENT DOCUMENTS

| | | | |
|---|---|---|---|
| 4,510,983 A | | 4/1985 | Ohkuni et al. |
| 4,706,724 A | * | 11/1987 | Ohkuni .................. 152/454 |
| 5,176,770 A | * | 1/1993 | Ohkuni .................. 152/530 |
| 5,379,818 A | * | 1/1995 | Suzuki .................. 152/531 |
| 5,795,418 A | * | 8/1998 | Suzuki .................. 152/530 |

FOREIGN PATENT DOCUMENTS

| | | |
|---|---|---|
| EP | 0 502 695 A1 | 9/1992 |
| JP | 63-227407 | 9/1988 |
| JP | 1-14042 | 3/1989 |
| JP | 64-67403 | 3/1989 |
| JP | 3-25005 | 2/1991 |
| JP | 3-82608 | 4/1991 |

* cited by examiner

*Primary Examiner*—Michael W. Ball
*Assistant Examiner*—Justin Fischer
(74) *Attorney, Agent, or Firm*—Sughrue Mion, PLLC

(57) ABSTRACT

A method of fitting a tire for an off road motorcycle. The diameter of the rim of a rear wheel (12) is one inch smaller than the diameter of the rim of a front wheel (18). Further, at least a tire (24) of the rear wheel is substantially a tire having a radial carcass with an aspect ratio of less than or equal to 80% and has at least one spiral belt. By providing a one-inch difference between the diameter of the rim of the rear wheel (12) and the diameter of the rim of the front wheel (18), the basic characteristics of the motorcycle can be maintained with the outer diameter of the rear wheel (12) being substantially the same as that of a conventional rear wheel, and the aspect ratio of the rear wheel tire (24) can further be reduced to 80 to 70%. Further, a so-called spiral belt is combined in conjunction with the radial construction employed for the rear wheel tire (24) so as to moderately suppress the rigidity of the tread portion. Accordingly, off road traction can be improved from the viewpoints of the configuration and the construction of the tire, and with this improvement, cushion characteristics can be maintained by means of the radial carcass and the spiral belt.

3 Claims, 2 Drawing Sheets

METHOD OF FITTING TIRE FOR OFF ROAD MOTORCYCLE, AND TIRE FOR OFF ROAD MOTORCYCLE

TECHNICAL FIELD

The present invention relates to a method of fitting a tire for an off road motorcycle, and a tire for an off road motorcycle, in which off road traction is improved while shock absorption is maintained.

BACKGROUND ART

Absorption of shock caused by uneven road surfaces, as well as so-called off road traction, has a great influence on the performance of a tire used for an off road motorcycle. For example, in order to keep the motorcycle going straight on an uneven road surface, tires having the following combination of specifications are used for an off road motorcycle of 250 cc displacement.

Size: 21 inches for a front wheel/19 to 18 inches for a rear wheel (a difference of greater than or equal to 2 inches is provided between the front wheel and the rear wheel)

Construction: a tire having a bias carcass for both the front and rear wheels

Aspect ratio: 100% for the front wheel/90 to 100% for the rear wheel

In order to further improve off road traction, it is effective to decrease the aspect ratio of the rear wheel tire so that the traction loss at the side portions of the tire is reduced. However, due to the construction of the tire, the rigidity of the tread portion is increased as the aspect ratio of the tire is decreased, thereby leading to considerable deterioration in so-called off road cushion characteristics (shock absorption). In addition, cushion characteristics are further deteriorated by this decrease in the aspect ratio (due to a reduction in thickness of the tire side portions), and therefore, it has been considered difficult to set the aspect ratio below the current aspect ratio, i.e., 100 to 90%.

DISCLOSURE OF THE INVENTION

In view of the aforementioned, an object of the present invention is to provide a method of fitting a tire for an off road motorcycle and a tire for an off road motorcycle, in which off road traction can further be improved while shock absorption is maintained, without impairing the basic characteristics of a current motorcycle.

A first aspect of the present invention is a method of fitting a tire for an off road motorcycle, wherein: the diameter of the rim of a rear wheel is one inch smaller than the diameter of the rim of a front wheel; and at least a tire of the rear wheel is substantially a tire having a radial carcass with an aspect ratio of less than or equal to 80% and has at least one spiral belt. By providing a one-inch difference between the diameter of the rim of the rear wheel and the diameter of the rim of the front wheel, the basic characteristics of the motorcycle can be maintained with the outer diameter of the rear wheel being substantially the same as that of a conventional rear wheel, and the aspect ratio of the rear wheel tire can further be reduced to 80 to 70%. Further, a so-called spiral belt is combined in conjunction with the radial construction employed for the rear wheel tire so as to moderately suppress the rigidity of the tread portion. Accordingly, it is possible to achieve both an improvement in the off road traction due to the configuration and the construction of the tires, and the ensuring of the cushion characteristics due to the radial carcass and the spiral belt.

A second aspect of the present invention is a tire for an off road motorcycle, wherein the tire is substantially a tire having a radial carcass with an aspect ratio of less than or equal to 80% and has at least one spiral belt. Since the tire for an off road motorcycle employs a spiral belt, it is possible to moderately suppress the rigidity of the tread portion as compared with a tire which employs a cross belt, and thus it is possible to maintain or improve cushion characteristics while maintaining traction performance.

PREFERRED EMBODIMENT FOR IMPLEMENTING THE INVENTION

In order to describe the present invention in more detail, the present invention will be described with reference to the accompanying drawings.

An embodiment of the present invention will be described with reference to FIGS. 1 and 2.

Figure 1:
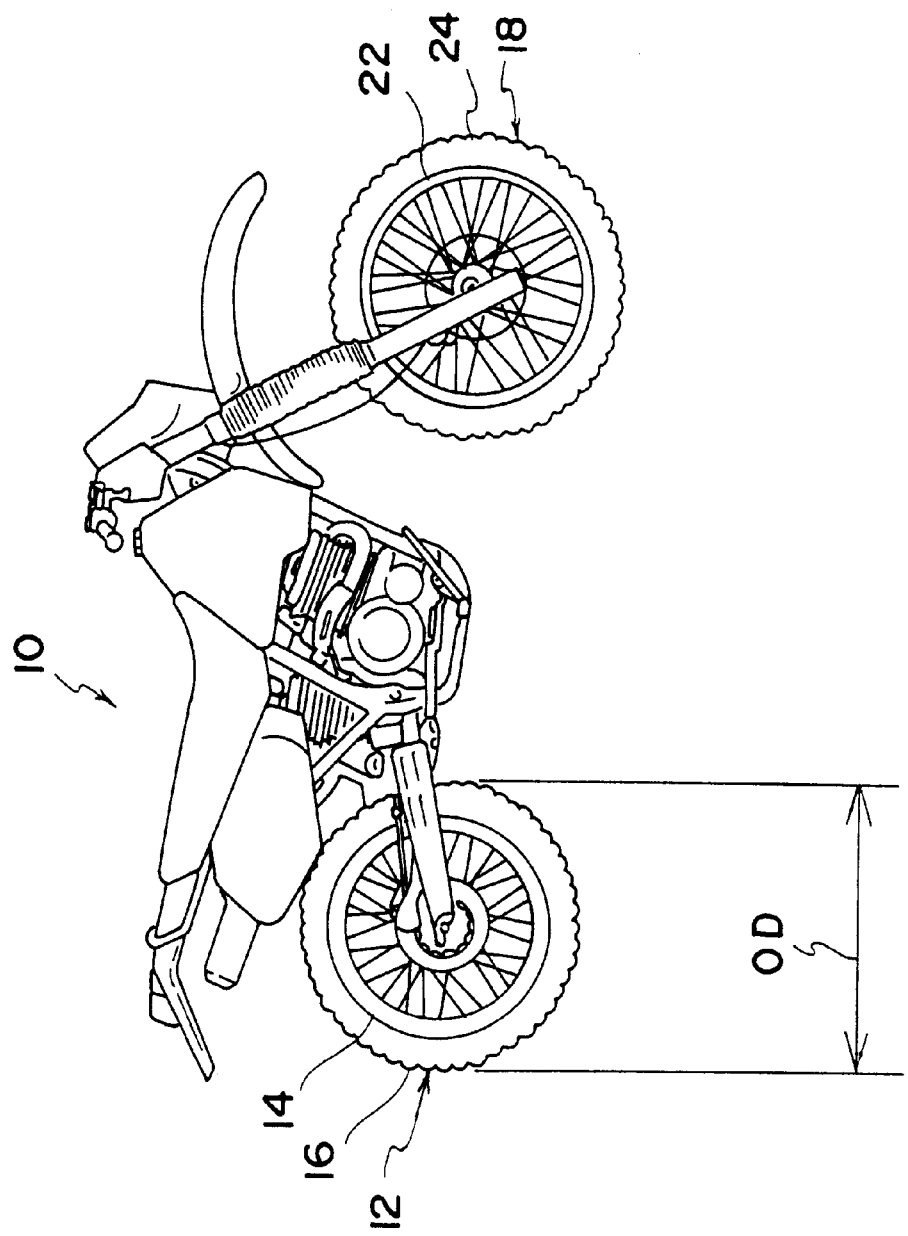
FIG. 1 is a side view of a motorcycle to which the present invention is applied.

As illustrated in FIG. 1, an off road motorcycle (a motorcycle of 250 cc displacement) 10, to which an embodiment of the method of fitting a tire for an off road motorcycle of the present invention was applied, has a rear wheel 12 and a front wheel 18. A pneumatic tire 16, having a rim 14 with a diameter of 20 inches and having an aspect ratio of 80%, is fitted on the rear wheel 12, while a pneumatic tire 24, having a rim 22 with a diameter of 21 inches and having an aspect ratio of 100%, is fitted on the front wheel 18.

The pneumatic tire 24 of the front wheel 18 is a bias tire having a well-known construction with a size of 80/100-21, and thus a description thereof is omitted.

On the other hand, the pneumatic tire 16 of the rear wheel 12 is a radial tire with a size of 110/80-20.

The construction of the pneumatic tire 16 will be described below.

Figure 2:
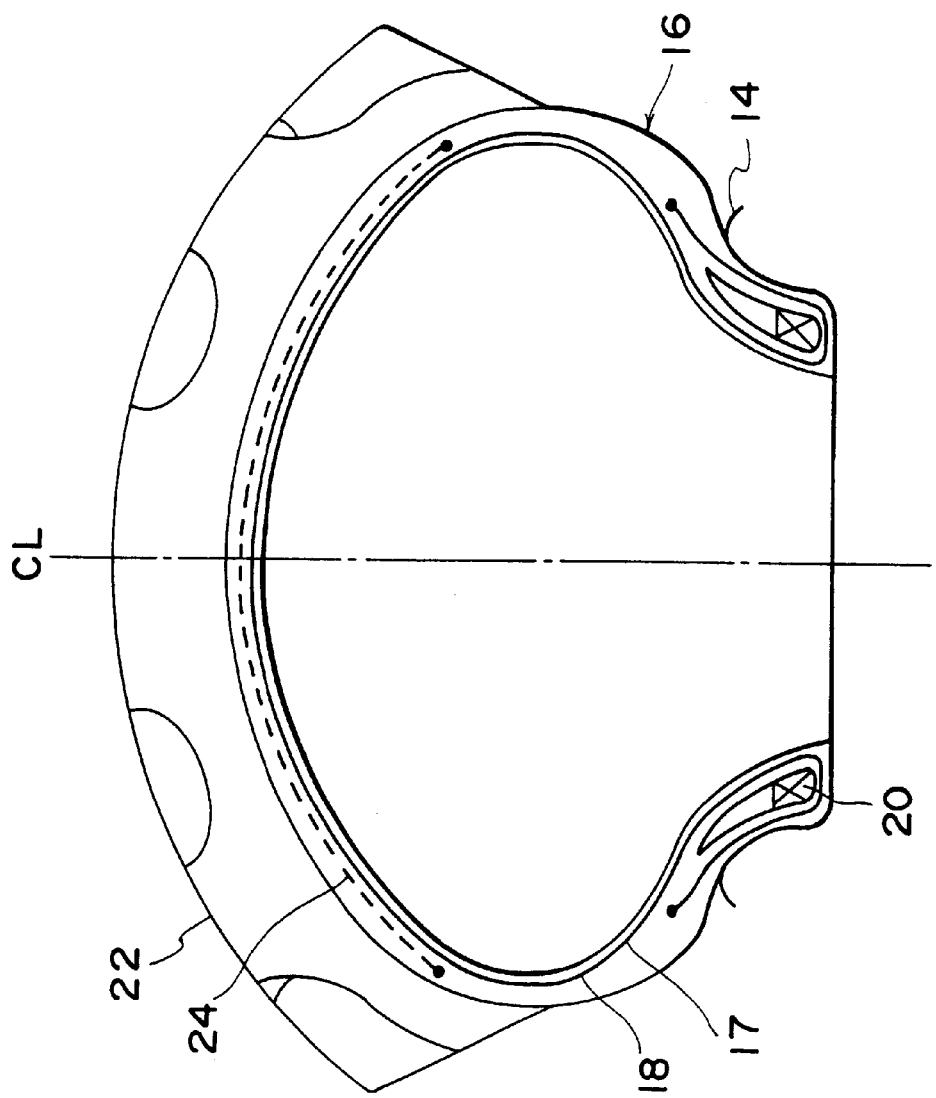
FIG. 2 is a cross-sectional view of a pneumatic tire relating to an embodiment of the present invention.

As shown in FIG. 2, a radial carcass 17 of the pneumatic tire 16 is formed from one carcass ply 18 in which cords are disposed substantially at an angle of 90° with respect to the circumferential direction of the tire. Each end portion of the carcass ply 18 is folded back around one of a pair of right and left bead cores 20.

Further, in a tread 22, one spiral belt 24 is embedded in the carcass ply 18 at the outer side thereof in the radial direction of the tire. The spiral belt 24 has cords which are disposed so as to be substantially oriented along the circumferential direction of the tire.

The operation of the present embodiment will be described next.

Conventionally, a pneumatic tire having a rim with a diameter of 19 inches and having an aspect ratio of 90% has been fitted on the rear wheel of the motorcycle 10. Therefore, the outer diameter OD (see FIG. 1) of the rear wheel 12 of the present embodiment, on which the pneumatic tire 16 having the rim 14 with a diameter of 20 inches and having an aspect ratio of 80% is fitted, is approximately the same as that of the conventional rear wheel. As a result, even if the method of fitting a tire for an off road motorcycle of the present embodiment is employed, the basic characteristics of the motorcycle 10 are not impaired.

Further, because the pneumatic tire 16 of the rear wheel 12 has a radial construction, and the aspect ratio thereof is less than that of the conventional tire, and moreover, the rigidity of the tread portion can be moderately suppressed by employing the spiral belt 24, accordingly, both an improvement in the off road traction due to the configuration and the construction of the tire 16, the ensuring of the cushion characteristics due to the radial carcass 17 and the spiral belt 24 can be achieved.

It is considered that the reason for the improvement in off road traction is due to the rigidity in the circumferential direction of the tread portion being increased due to the cords of the spiral belt 24 being substantially oriented along the circumferential direction of the tire, and thus there is little traction loss caused by tread patterns.

Moreover, since the side portions of the tire are formed from a so-called narrow-angle radial ply, excessive traction loss caused by the twisting of the side portions is prevented, and traction is thus substantially improved.

TEST EXAMPLES

In order to confirm the effects of the present invention, Conventional Example test tires, Comparative Example test tires, and Example test tires to which the present invention was applied were respectively prepared. These test tires were respectively fitted on a motorcycle (a motocross of 250cc displacement, made in Japan), and feeling tests for the three patterns, i.e., the Conventional Example, the Comparative Example and the Example, were respectively conducted by actual running on a motorcycle on an authorized motocross course by two international A-ranked riders. The fitting methods and the constructions of each of the Conventional Example tires, the Comparative Example tires and the Example tires are listed in the following Table 1. The test results are also listed in the following Table 1. The maximum number of points for the evaluation is five, and three points are given for the Conventional Example.

TABLE 1

|   |   | Traction Level | Shock Absorption |
|---|---|---|---|
| Conventional Example | Front wheel 80/100-21 bias tire<br>Carcass<br>Polyester 1500d/2 × 2 ($\alpha = 33°$)<br>Number of Embedded cords<br>24/25 mm<br>Breaker<br>Nylon 840d/2 × 2 ($\alpha = 33°$)<br>Number of Embedded cords<br>26/25 mm<br>Rear wheel 110/90-19 bias tire<br>Carcass<br>Polyester 1500d/2 × 2 ($\alpha = 29°$)<br>Number of Embedded cords<br>30/25 mm<br>Breaker<br>Nylon 840d/2 × 1 ($\alpha = 29°$)<br>Number of Embedded cords<br>27/25 mm | 3 | 3 |
| Comparative Example | Front wheel 80/100-21 bias tire<br>Same as Conventional Example<br>Rear wheel 110/80-20 radial tire<br>Carcass<br>Nylon 1260d/2 × 1 ($\alpha = 90°$)<br>Number of Embedded cords<br>28/25 mm<br>Belt Cross belt<br>Aramide 1500d/2 × 2 ($\alpha = 20°$)<br>Number of Embedded cords<br>21/25 mm | 4 | 2 |
| Example | Front wheel 80/100-21 bias tire<br>Same as Conventional Example<br>Rear wheel 110/80-20 radial tire<br>Carcass<br>Nylon 1260d/2 × 1 ($\alpha = 90°$)<br>Number of Embedded cords<br>28/25 mm | 4.5 | 3 |

TABLE 1-continued

|   | Traction Level | Shock Absorption |
|---|---|---|
| Belt One spiral belt<br>Aramide 1500d/2 × 1 ($\alpha = 0°$)<br>Number of Embedded cords<br>30/25 mm |   |   |

Evaluation

5: remarkably good

4: good

3: unchanged

2: poor

1: remarkably poor

Angle $\alpha$ is the angle of the cords with respect to the circumferential direction of the tire.

As shown in the Table 1 above, in the Example, it can be seen that the traction level is improved while shock absorption is maintained at the same level as that of the Conventional Example. In the Comparative Example, since the belt of the rear wheel is a cross belt, the rigidity of the tread portion is increased, but shock absorption is decreased.

In the above-described Example, the size of the rim of the front wheel is 21 inches, and that of the rear wheel is 20 inches. In the fitting method in accordance with the present invention, however, the size of the rim is not limited to the above-mentioned size as long as the rim diameter of the rear wheel is one inch smaller than that of the front wheel.

Further, in the above-described embodiment, the pneumatic tire 24 of the rear wheel 18 is a bias tire, however, the pneumatic tire 24 may also be a radial tire.

Practical Use of the Invention in the Industry

As described above, in the method of fitting a tire for an off road motorcycle relating to the first aspect of the present invention, the basic characteristics of a motorcycle are maintained. Further, off road traction can be improved while cushion characteristics are maintained. Accordingly, this method is suitable for use mainly in off road motorcycles, which travel off road.

The tire for an off road motorcycle relating to the second aspect of the present invention is suitable for use in off road motorcycles traveling off road, in which both traction and cushion characteristics are required.

What is claimed is:

1. A method of fitting a tire for an off road motorcycle, wherein:

the diameter of the rim of a rear wheel is one inch smaller than the diameter of the rim of a front wheel; and at least a tire of the rear wheel is substantially a tire having a radial carcass with an aspect ratio of less than or equal to 80% and has at least one spiral belt; and wherein the aspect ratio of the tire of the rear wheel is 20 to 30% less than the aspect ratio of the tire of the front wheel.

2. A method of fitting a tire for an off road motorcycle according to claim 1, wherein the diameter of the rim of the front wheel is 21 inches, the diameter of the rim of the rear wheel is 20 inches, and the aspect ratio of the front wheel tire is 100%.

3. A method of fitting a tire for an off road motorcycle according to claim 1, wherein said spiral belt includes cords disposed to be substantially oriented along the circumferential direction of said tire of the rear wheel.

* * * * *